United States Patent Office 3,002,025
Patented Sept. 26, 1961

3,002,025
SYNTHESIS OF CITRAL FROM GERANYL ALKYL ETHERS
Paul G. Bay, Skokie, Ill., assignor to The Glidden Company, Cleveland, Ohio, a corporation of Ohio
No Drawing. Filed July 9, 1958, Ser. No. 747,337
4 Claims. (Cl. 260—601)

This invention relates to a process for preparing citral by the oxidation of geranyl alkyl ethers. The invention is more specifically concerned with a novel synthesis of citral by treatment of lower alkyl ethers of geraniol with an oxidation substance to be described more fully hereinbelow.

The most important acyclic terpene aldehydes found in nature are citronellal and citral. Citral, for example, is present in the volatile oil of lemon, lemon grass and orange. It is a yellow liquid possessing a strong lemon odor and is used in the fortification of lemon oil and other flavor compositions. As is known, the supply of these compounds usually depends on the importation of expensive essential oils whose quality and availability varies from time to time. Since citral is a product of technical importance and valuable industrially, it would be desirable to provide a process for preparing it from domestically available raw materials.

An object of my invention is the preparation of citral from domestic materials.

A further object of my invention is the preparation of citral by the oxidation of geranyl alkyl ethers.

Other objects will be apparent to those concerned by reference to the specification of my invention which follows.

I have found that I can prepare citral in significant amounts by a procedure which includes the treatment of geranyl alkyl ether(s) with the alkyl chromates of tertiary alcohols, said treatment being conducted in a solvent for said chromate and ether and preferably in an acidic medium. Essentially my invention can be defined as a low temperature process for preparing citral from geranyl alkyl ethers by reaction of said ethers at temperatures below 55° C. with tertiary butyl chromate in solvents such as carbon tetrachloride or petroleum ether.

The starting materials of my invention, the geranyl alkyl ethers, and more specifically, the lower alkyl ethers, for example, methyl, ethyl, propyl and butyl ethers, can be prepared by the process described in my co-pending application Serial No. 748,791, filed July 16, 1958. In that application, there is described a process for preparing the lower alkyl ethers of geraniol which includes the treatment of myrcene hydrochloride with a solution of a low molecular weight alcohol, said solution containing a basic substance capable of neutralizing hydrogen ions. The lower alkyl ethers thus prepared, for example, geranyl, methyl, ethyl, propyl, butyl, tertiary butyl ethers can be used herein for the preparation of citral in accordance with the teachings of this invention.

I have found that tertiary alkyl chromates are well adapted for the oxidation process of my invention. More specifically, I have found that the lower tertiary alkyl chromates, that is, those corresponding to tertiary alcohols, for example, tertiary butyl chromate, in a non-polar solvent can be employed with good results as will be illustrated in the specific examples.

The solvents applicable in the process of this invention are preferably those which do not in themselves react with the tertiary alkyl chromates and that can be used to maintain a homogeneous reaction medium to facilitate a rapid reaction. I can employ carbon tetrachloride, or petroleum ether for this purpose, or I can select from hydrocarbon solvents such as benzene, hexane, octane and the like, or I can employ tertiary butyl alcohol under special conditions as will be illustrated below. Anhydrous conditions are desirable for the reactions described herein, although such conditions are not absolutely necessary.

The oxidation reagents of my invention can be illustrated by mixtures as follows: (1) a mixture consisting of dry tertiary butyl chromate in tertiary butanol and petroleum ether; (2) a mixture consisting of dry tertiary butyl chromate in carbon tetrachloride from which any excess tertiary butanol is removed; and (3) a mixture consisting of dry tertiary butyl chromate in carbon tetrachloride or petroleum ether to which has been added about 10% of glacial acetic acid or any lower fatty acid and 5% acetic anhydride. I prefer to use a mixture as illustrated in (3) since such a mixture has given superior results.

In one preferred aspect of my invention, I treat a mixture consisting of tertiary butyl chromate reagent and geranyl alkyl ether in a solvent as defined at a temperature of from 0° to below 55° C. and maintain this reaction for a period of time sufficient to yield significant quantities of citral. I have found that reaction times of from one hour to about one hundred hours can be employed. The optimum time depends upon the solvent and concentration and type of the oxidizing mixture. However, adequate reaction times are from one to ten hours.

The citral obtained by the process as defined above can be recovered from the reaction mixture; that is, the unreacted alkyl ethers, and these ethers can again be used or recycled to the process. In this connection, the reaction time to which the mixture can be subjected will depend to some extent on the optimum yield of citral desired per unit volume of starting material. Although I have found that citral itself will undergo reaction to some extent in the presence of t-butyl chromate, such a reaction is minimized in the instant process since the oxidation mixture is selective to a large extent in reacting first with the alkyl ethers. Nevertheless, it is desirable to conduct the reaction for a length of time not detrimental to the end product, citral. Thus, I have found that it is only necessary to continue the reaction for a period of time sufficient to yield up to about 50% of citral preferably from 15 to 30% and recover the unreacted material for retreatment in accordance with my process. Generally then, short reaction periods favor satisfactory material balance, but with corresponding diminishing yields of citral.

The ratio of tertiary butyl chromate (or other tertiary alkyl chromate) to the geranyl alkyl ether can vary within the range of from 1 to about 6 moles although I prefer to use ratios of the order of from 2 to 3 moles. I have also found that is desirable to maintain a concentration of tertiary butyl chromate in the oxidizing mixture of about one mole of chromate per 400 ml. of said oxidizing mixture. More concentrated solutions tend to be unstable. More specifically, it is desirable to maintain a concentration of one mole or below of chromate in petroleum ether or carbon tetrachloride per 400 ml. of tertiary butyl chromate.

The reaction products of my invention can be worked up by treatment first with an aqueous acid, for example, oxalic acid, tartaric, hydrazine sulfate, etc., followed by extraction with ether and petroleum ether, washing, drying and removing the solvent by distillation. It is believed that the aqueous acid hydrolizes the intermediate complexes and serves to reduce the excess oxidizing power of the solution. The crude products have been analyzed by infrared and ultraviolet methods showing the production of the desired citral.

The synthetic citral so prepared can be purified by distillation through a Claisen flask to obtain a fraction boiling at 120–124/16 mm. pressure which is a good quality fraction.

While I have indicated above, generally, the use of anhydrous solutions of tertiary butyl chromate in the treatment of geranyl alkyl ethers, I have found that optimum results can be obtained in the production of citral if the reaction mixture is made acidic, such as by the addition of small quantities of acetic acid and acetic anhydride. The amounts which can be added will vary, but those in the order of 5% to 20% have given adequate results. Other acids which can be employed in place of acetic acid are the lower molecular weight fatty acids such as propionic, butyric and also others such as isobutyric, valeric, etc. The use of an acidic medium appears to increase the reaction rate and also the products do not have to be subjected to oxidizing agents for long periods of time.

The following serves to illustrate the procedure used for preparing the preferred oxidation mixture of my invention: 185 grams of chromium trioxide ($CrO_3$) was added to 370 grams of tertiary butyl alcohol. To this resulting mixture there was then added 1.5 liters of carbon tetrachloride and the mixture was dried by shaking with anhydrous sodium sulfate. Following this, the mixture was concentrated by distillation to from about 760 to 1200 ml. Acetic acid (10% the volume of the oxidizing mixture) and acetic anhydride (50% the volume of acetic acid) was then added before the oxidizing mixture was added to the geranyl alkyl ether. Approximately 2.5 equivalents of $CrO_3/1.0$ equivalents of ether was utilized in the preparation of citral.

In order to more fully describe my invention, reference will be made to the following examples which are illustrations thereof.

*Example 1*

A 15.0 gram sample of geranyl isopropyl ether was added to 78.6 ml. of 48% tertiary butyl chromate in carbon tetrachloride solution containing 8 ml. of acetic acid and 4.0 ml. of acetic anhydride. The reaction was kept for five hours in an ice bath making certain that the temperature did not exceed 40° C. The mixture was quenched in 300 ml. of water and treated with 75.0 grams of oxalic acid. After extraction with petroleum ether, the mixture was dried with anhydrous sodium sulfate and the solvent removed by distillation. Approximately 57% of citral was obtained based on weight of consumed ether.

*Example 2*

Sitxty grams (60 g.) of geranyl methyl ether was added dropwise to 700 ml. of 36% tertiary butyl chromate in carbon tetrachloride containing 60 ml. of acetic acid and 30 ml. acetic anhydride. The mixture was maintained at room temperature to 40° C. for 69 hours with occasional shaking. The mixture was then treated with 150.0 grams of oxalic acid dissolved in water and the carbon tetrachloride layer was separated, washed, and dried. Upon removal of the solvent, 40% (based on weight of consumed geranyl methyl ether) of citral was obtained by fractional distillation.

The oxidation of geranyl methyl ether using an oxidizing mixture consisting of dry tertiary butyl chromate in tertiary butanol and petroleum ether is demonstrated in Example 3.

*Example 3*

To 24.2 grams (0.144 mole) of geranyl methyl ether, there was added 427 ml. of tertiary butyl chromate in tertiary butanol and petroleum ether (ratio ⅓ by volume). The moles of chromium trioxide contained in the volume of tertiary butyl chromate used was 0.43. The mixture was maintained at room temperature to 40° C. for 96 hours with occasional shaking. The mixture was then treated with oxalic acid dissolved in water, washed and dried. Upon removal of the solvent, 13.7% of citral was obtained based on the weight of consumed geranyl methyl ether.

*Example 4*

A further experiment was conducted using 16.09 grams (0.095 mole) of geranyl methyl ether in 158 ml. of a mixture consisting of dry tertiary butyl chromate in carbon tetrachloride solvent. The amount of chromium trioxide contained in the volume of tertiary butyl chromate was 0.29 mole. The mixture was treated as above for a reaction time of 91.5 hours, finally giving a yield of 21.4% of citral based on the weight of consumed geranyl methyl ether.

Although the invention has been demonstrated with reference to certain illustrative examples, it should be realized that modifications can be made falling within the scope of my invention.

Having thus described my invention, I hereby claim:

1. A process for preparing citral which comprises treating geranyl alkyl ethers with lower tertiary alkyl chromates in a solvent for said ethers and chromates under substantially anhydrous conditions and maintaining the mixture at a reaction temperature of from about 0° to below 55° C. for a period of time sufficient to produce said citral, the amount of tertiary alkyl chromate employed in the reaction being at least about one mole per mole of alkyl ether.

2. The process for preparing citral which comprises treating a lower alkyl ether of geraniol with an oxidizing mixture of a lower tertiary alkyl chromate in a solvent for said ether and chromate, said treatment being carried out in a substantially anhydrous medium and maintaining the resultant mixture at a reaction temperature of from about 0° to below about 55° C. for a period of time sufficient to produce said citral, the amount of tertiary alkyl chromate employed in the reaction being at least about one mole per mole of alkyl ether.

3. The process for preparing citral which comprises essentially in treating geranyl alkyl ethers, the alkyl groups in said ethers containing from 1 to 4 carbon atoms, with tertiary butyl chromate in a solvent for said ethers and chromate and in a substantially anhydrous medium and maintaining the resultant mixture at a reaction temperature of from about 0° to below 55° C. for a period of time sufficient to produce said citral, the amount of tertiary alkyl chromate employed in the reaction being at least about one mole per mole of alkyl ether.

4. The process of claim 3 wherein the solution of tertiary butyl chromate contains acetic acid and acetic anhydride in small quantities.

References Cited in the file of this patent

UNITED STATES PATENTS 2,589,275    Naves _____ Mar. 18, 1952

OTHER REFERENCES

West et al.: Synthetic Perfumes (1949), page 93.
Simonsen: The Terpenes, vol. I (1953), page 43.